United States Patent [19]

Gammie, II

[11] Patent Number: 5,328,596
[45] Date of Patent: Jul. 12, 1994

[54] LUBRICATING OIL REFINING PROCESS

[75] Inventor: Douglas J. Gammie, II, Fairless Hills, Pa.

[73] Assignee: Mobil Oil Corporation, Fairfax, Va.

[21] Appl. No.: 52,963

[22] Filed: Apr. 27, 1993

[51] Int. Cl.$^5$ .................. C10G 21/28; C10G 7/08; C10G 21/20; B01D 3/06
[52] U.S. Cl. .................. 208/321; 208/311; 208/319; 208/320; 208/322
[58] Field of Search .......... 208/311, 321, 180, 96, 208/183, 181, 179, 435, 182, 183, 326, 313, 319, 322; 159/6, 6 W

[56] References Cited

U.S. PATENT DOCUMENTS

| | | | |
|---|---|---|---|
| 4,208,263 | 6/1980 | Audeh et al. | 204/188 |
| 4,399,025 | 8/1983 | Fletcher et al. | 208/180 |
| 4,419,227 | 12/1983 | Sherman | 208/326 |
| 4,422,923 | 12/1983 | Wirtz et al. | 208/321 |
| 5,059,303 | 10/1991 | Taylor et al. | 208/96 |

OTHER PUBLICATIONS

Thermal Stability of Furfural, A. Dunlop and F. N. Peters, Jr., Ind. & Eng. Chemistry, vol. 32, #12, pp. 1639–1641.
Kirk-Othmer, Encyclopedia of Chemical Technology, pp. 562–570, 2nd Ed., vol. 8.
Encyclopedia of Chemical Processing and Design, Marcel Dekker, Inc., No. 20, p. 415.

Primary Examiner—Helane Myers
Assistant Examiner—Bekir L. Yildirim
Attorney, Agent, or Firm—Alexander J. McKillop; Malcolm D. Keen; Richard D. Stone

[57] ABSTRACT

Thermal degradation of furfural in solvent refining of lubricating oil stocks is reduced by use of a thin-film evaporator for the final stages of furfural recovery, permitting increased pressure to be used in each stage of furfural recovery.

15 Claims, 3 Drawing Sheets

LUBRICATING OIL REFINING PROCESS

FIELD OF THE INVENTION

The invention relates to refining lubricating oil with furfural and recovery of furfural solvent by evaporation.

BACKGROUND OF THE INVENTION

Refining of crude oil to produce lubricating oil is one of the oldest refinery arts. Suitable crudes are fractionated to isolate a suitable boiling range material, usually in the 600° to 1000° F. range, to produce a distilled oil fraction. Various solvent purification steps are then used to reject components not suitable for lubricating stock.

Aromatics are too unstable, and refiners resort to various means to remove aromatics from potential lube fractions. While many solvents were proposed for aromatics extraction, furfural has been a preferred solvent since about 1933 when the first commercial furfural extraction units were built.

Furfural is denser than oil and related to formaldehyde. It is a solvent for aromatics. When furfural and a heavy oil fraction mix, the furfural dissolves much of the aromatics content of the heavy oil. Upon settling, an extract phase or dense furfural phase containing most of the aromatics separates from a raffinate phase of lighter hydrocarbons with a reduced amount of aromatics. As in most liquid/liquid extraction processes the separation is not perfect. Some aromatics remain in the raffinate and some furfural dissolves in the raffinate. Fractionation of the extract and raffinate recovers the furfural solvent for reuse.

Some representative patents on preparation of lubricants by solvent extraction include U.S. Pat. Nos. 2,698,276, 3,488,283 and 4,208,263 which are incorporated by reference.

Although in use for more than 60 years, solvent recovery is a problem, one which has become a severe problem as costs of energy have soared.

At its inception, furfural recovery was straightforward, and wasted energy. Furfural was believed to be thermally stable, and efforts were directed to its recovery rather than its preservation. Recovery by simple multiple stage heating and flashing or evaporation was straightforward.

Thermal stability of furfural was a "fact" since the 40's. Dunlop and Peters, Jr. reported in Ind. & Eng. Chemistry V. 32 #12, 12/40:

Thermal Stability of Furfural: The data presented show that, under the specific conditions of these experiments, refined furfural is quite stable . . . from an industrial standpoint furfural is thermally stable. No commercial process is known wherein furfural is subjected to temperatures of the magnitude of 230°–275° C. for more than a few minutes, and . . . it is a matter of hours before a change in the properties of furfural can be detected." (Abstract)

Several stages of furfural recovery were typically used, each at successively lower pressures to improve vaporization. Typically three towers were used, each with a heater, and each with an overhead vapor condenser. This did a fine job at recovering furfural, but required vaporization and condensation of large amounts of material several times. Such energy profligacy might be acceptable when energy was cheap but not when it was dear. It could not be tolerated in furfural aromatic extraction units where from 10 to 50 moles of solvent are present per mole of extract.

In response, engineers modified the furfural recovery section. Typically three stages of furfural recovery are still used, but each stage operates at higher, rather than lower, pressure. Condensing vapor from downstream stages supplies much or all of the heat input needed by each upstream stage. In many units the only heat input is to the last, typically third stage, furfural recovery tower. Liquid would be pumped from the first stage to a second stage operating at a higher pressure, and pumped from the second stage to the third stage. Pumping was necessary so that the vapors released in a downstream stage would have a pressure high enough that condensing vapors would heat an upstream stage.

In many units this pressure reversal also reversed the rates of furfural recovery. In most prior art furfural recovery processes, with decreasing pressure in each stage, most of the furfural was recovered in the first stage, and lesser amounts in succeeding stages. A steam stripper could then be used as a final clean up device, to create a pseudo vacuum and remove the last traces of furfural from the extract.

In the modern, ascending pressure approach more furfural is vaporized in downstream units to provide enough condensing vapor to heat the upstream units. Typically, the first stage flash, the low pressure flash (LP Flash) operates at 5–20 psig while the second stage, the medium pressure flash (MP Flash), is at 10–40 psig. The third stage of recovery, a high pressure flash (HP Flash) may operate at 15–50 psig. A typical unit operates with pressures of about 10–20–35 psig in stages 1-2-3, respectively.

Large amounts of furfural usually remain despite three stages of flashing because of the higher pressures now used in the downstream stages. The stripper, typically operating under a vacuum, must recover fairly large amounts of furfural in a modern ascending pressure unit. For a unit recovering 2600 pound moles per hour of furfural from 60 moles/hr of extract, furfural and extract traffic is:

|  | PSIG | moles/hr furfural | moles/hr extract |
| --- | --- | --- | --- |
| LP Flash | 10 | 600 | 60 |
| MP Flash | 20 | 800 | 60 |
| HP Flash | 35 | 1000 | 60 |
| Stripper | −10 | 200 | 60 |

The table above reports the amount of furfural vaporized at each stage, and the amount of extract passing through each stage as a liquid. The LP Flash vaporizes 600 lb moles/hour of furfural, while the HP Flash has to vaporize significantly more (1000 lb moles/hour) furfural. The stripper is required to remove a lot of furfural under vacuum conditions.

Many commercial units are about this size, but the numbers have been rounded to one significant figure to illustrate simply the way modern units operate. The feed to the furfural recovery section has almost 40 times as much furfural as extract, on a molar basis.

Furfural vaporization decreases as pressure increases, so ever higher temperatures are needed to remove increasing amounts of furfural at the higher pressures of each downstream flash stage. Much of the furfural is recovered at the highest pressure, putting severe demands on the fired heater associated with the HP flash. Quite a lot of furfural remains in the liquid from the high pressure flash, so a stripper, or a vacuum flash and a stripper, typically recover additional amounts of furfural from the high pressure flash liquid fraction.

Some refineries use only two stages of flashing, rather than the three stages described above, and some may use four or more stages. The common thread in all of these modern furfural recovery units has been use of higher pressure and higher temperature in downstream units to generate furfural vapor which can be used to heat at least one upstream flash unit.

This modern, ascending pressure approach saves energy and has been widely adopted in the refinery industry. Instead of expending the energy to vaporize 2400 moles of furfural (the total amount removed in three stages of flashing), a refiner need only vaporize the 1000 moles vaporized in the third stage, or high pressure flash. These vapors are at a high enough pressure that they will condense, and release their heat, in heat exchange with feed to the MP Flash. The vapor from the MP flash in turn heats the feed to the LP flash. The refiner vaporizes 2600 moles of furfural, but expends only enough energy to vaporize 1000 moles, because of the multiple evaporation effect.

There is little capital or operating cost involved in pumping liquids from tower #1 operating at, e.g., 10 psig into tower #2 operating at 20 psig. This new approach has been widely adopted. It solves an energy problem, but creates a furfural degradation problem.

At the pressure in the high pressure flash, typically 35-50 psig, the temperature required for adequate furfural evaporation rates is usually above 450° F. Refiners now use fired heaters, many of which operate with tube wall temperatures over 500° F. Such high temperatures are needed to evaporate furfural from the extract oil fraction at the pressures required in the high pressure flash. Such temperatures also are high enough to degrade the furfural.

Furfural is reactive at these temperatures and decomposes into a hard crusty coke which deposits in refinery processing equipment. These coke deposits build up until the furfural extraction unit must be shut down for cleaning. A commercial unit is typically cleaned every year, more frequently in some cases. The unit may be down for one to two weeks, causing lost production time. Thermal decomposition of furfural also means a loss of valuable solvent, and potential contamination of the extract oil product fractions.

Furfural operators knew of the problem, but most still shut their units down once a year or so for cleaning. Some resort to adding amines or proprietary treatments from vendors such as Aquachem to reduce the rate of decomposition of furfural, or to keep the decomposition products in suspension. Chemical treatments help, but are expensive.

Some refiners extend run lengths by downgrading their equipment capacity. Thus a fired heater may not be used to capacity, or is deliberately oversized, so that tube or wall temperatures (and furfural degradation) may be reduced.

I wanted to reduce or end unit shutdowns, and also reduce or end furfural decomposition. I discovered a multi-step way to recover furfural solvent from extract oil, which used most of the existing equipment in a lube refinery for at least the initial stage(s) of furfural recovery and a new type of furfural recovery, for some or all of the final stage(s). The solution was to use a thin film evaporator, such as a long-tube vertical evaporator or agitated thin-film evaporator, to do some or all of the final stages of furfural recovery.

None of these evaporators are new, they have been available to refiners for decades. More details about Long-tube vertical (LTV) evaporators, and the falling-film version of the LTV may be taken from Perry's Chemical Engineer's Handbook, 6th Edition, in the section on EVAPORATORS from 11-31 to 11-41, incorporated by reference.

The equipment is also described in Kirk-Othmer, ENCYCLOPEDIA OF CHEMICAL TECHNOLOGY, 2nd edition, Volume 8, page 568, and FIG. 7, which are incorporated by reference. As stated therein, the long-tube vertical evaporator consists simply of a vertical single-pass shell-and-tube heat exchanger surmounted by a V/L separator. Tubes are typically 2" by 24-36' in black-liquor service. This size is reported to be the cheapest form in which heating surface can be provided in any evaporator.

Another description of the equipment is provided by McKetta and Cunningham in Encyclopedia of Chemical Processing and Design, Volume 20, Evaporators and Evaporation, starting at page 415, and especially FIG. 4, which is incorporated by reference. They reported the tubes are usually about 50 mm diameter by 7 to 10 m long, packaging a large amount of heating surface in a single shippable tube bundle. This reference reports that long tube vertical evaporators are the most common of the film type evaporators, with more evaporative capacity than all other steam-heated types combined.

Such equipment is available commercially from vendors such as Blaw Knox and Swenson.

Such evaporators have never been used for furfural recovery in a lube refinery. This may be due in part to difficulties which would be experienced if such devices were used as the sole means of furfural recovery. As stated in Kirk Othmer, Volume 9, Evaporation, in the section on wiped-film evaporators: "Such evaporators exhibit poor heat transfer performance on low viscosity fluids because of the added resistance of the metal wall." Another concern is that these devices are expensive, and too costly to use for recovery of furfural solvent, in view of the large molar ratios of furfural to extract which are involved.

I realized a hybrid approach was needed. Most of the furfural recovery should be conventional, using flash separation. Preferably thin film evaporation is used only for the final stages of furfural recovery, when the temperatures are highest. In this way conventional, and usually existing, equipment can be used for economical recovery of most of the furfural for no capital and low operating expense, while the high capital cost solvent recovery step is reserved for the final stages of the operation. My process will involve some capital cost for LTV or wiped film evaporators, but the energy required to recover furfural in this type of evaporator will be less than a fired heater. Thus my process can save energy and eliminate a fired heater, in some installations. In any installation rapid payouts for new equipment will occur. The modest capital costs associated with the selective use of thin film evaporators can be recovered in just a few months in many instances, if proper credit is taken for all the costs of furfural degradation in fired heaters.

BRIEF SUMMARY OF THE INVENTION

Accordingly, the present invention provides a process for refining an oil chargestock containing an aromatic rich fraction and a lubricating oil stock fraction comprising charging said oil chargestock to a liquid/liquid furfural aromatics extraction means and extracting said aromatic rich fraction by dissolving same in furfural to produce a raffinate phase containing lubricating oil stock and a furfural extract phase containing said aromatics rich fraction; heating said furfural extract phase by indirect heat exchange with a higher pressure vaporized furfural stream to produce a heated liquid stream; flashing said heated feed liquid stream in a low pressure flash vessel operating at a pressure below 50 psig to produce a low pressure furfural vapor phase and a low pressure flash liquid phase containing furfural solvent which are removed from said vessel; heating, and simultaneously vaporizing, at least a portion of said low pressure flash liquid phase by indirect heat exchange in a thin-film evaporator to produce an aromatic rich liquid phase product with a reduced furfural content and vaporized furfural; and cooling and condensing said vaporized furfural to produce liquid furfural; and recycling said liquid furfural to said liquid/liquid aromatics extraction means.

In another embodiment, wherein thin-film evaporation is used to replace the vacuum flash and stripper, the present invention provides a multi-stage process for recovering furfural solvent from a feed liquid stream containing hydrocarbons boiling within the range of 600° to 1000° F. and furfural comprising: heating said feed liquid stream by indirect heat exchange with a higher pressure vaporized furfural stream to produce a heated liquid stream; flashing said heated feed liquid stream in a low pressure flash vessel operating at a pressure below 50 psig to produce a low pressure furfural vapor phase and a low pressure flash liquid phase containing furfural solvent which are removed from said vessel; pumping said low pressure flash liquid phase to increase the pressure and produce a pumped liquid stream having a higher pressure; heating said pumped liquid by indirect heat exchange with a vaporized furfural stream to produce a heated pumped liquid stream; flashing said heated pumped liquid in at least one high pressure flash vessel operating at a pressure above said low pressure flash vessel to produce a high pressure furfural vapor phase and a high pressure liquid phase; cooling and condensing at least a portion of said high pressure furfural vapor phase by indirect heat exchange with said feed liquid stream to produce a liquid furfural solvent product stream; evaporating additional amounts of furfural from said high pressure liquid phase by indirect heat exchange in a thin film evaporator to produce a hydrocarbon liquid product containing a reduced amount of furfural and a furfural vapor product.

In yet another embodiment, wherein thin-film evaporation is used to replace at least one stage of flash separation, the present invention provides a multi-stage process for recovering furfural solvent from a feed liquid stream containing hydrocarbons boiling within the range of 600° to 1000° F. and furfural comprising: heating said feed liquid stream by indirect heat exchange with a higher pressure vaporized furfural stream to produce a heated liquid stream; flashing said heated feed liquid stream in a low pressure flash vessel operating at a pressure below 50 psig to produce a low pressure furfural vapor phase and a low pressure flash liquid phase containing furfural solvent which are removed from said vessel; pumping said low pressure flash liquid phase to increase the pressure and produce a pumped liquid stream having a higher pressure; heating, and simultaneously vaporizing, said pumped liquid by indirect heat exchange in a thin-film evaporator to produce a high pressure furfural vapor phase and a high pressure liquid phase with a reduced furfural content; and cooling and condensing at least a portion of said high pressure furfural vapor phase by indirect heat exchange with said feed liquid stream to produce said heated feed liquid and a liquid furfural solvent product stream.

In a preferred embodiment, the present invention provides a multi-stage process for recovering furfural solvent from a feed liquid stream comprising hydrocarbons boiling within the range of 600° to 1000° F. and furfural present in an amount equal to at least 10 moles of furfural per mole of hydrocarbon, comprising heating said feed liquid stream by indirect heat exchange with a higher pressure vaporized furfural stream to produce a heated liquid stream; flashing said heated feed liquid stream in a low pressure flash vessel operating at a pressure below 50 psig to produce a low pressure furfural vapor phase and a low pressure flash liquid phase containing furfural solvent which are removed from said vessel; pumping said low pressure flash liquid phase to produce a pumped liquid stream having at least 5 psi higher pressure; heating said pumped liquid by indirect heat exchange with a vaporized furfural stream having a pressure at least 5 psi higher than the pressure of said pumped liquid to produce a heated pumped liquid stream; flashing said heated pumped liquid in at least one high pressure flash vessel operating at a pressure at least 5 psi above said low pressure flash vessel to produce a high pressure furfural vapor phase and a high pressure liquid phase; cooling and condensing at least a portion of said high pressure furfural vapor phase by indirect heat exchange with said feed liquid stream to produce a liquid furfural solvent product stream; evaporating additional amounts of furfural from said high pressure liquid phase by indirect heat exchange in a thin film evaporator to produce a hydrocarbon liquid product with a reduced amount of furfural and a furfural vapor product.

DETAILED DESCRIPTION

Figure 1:
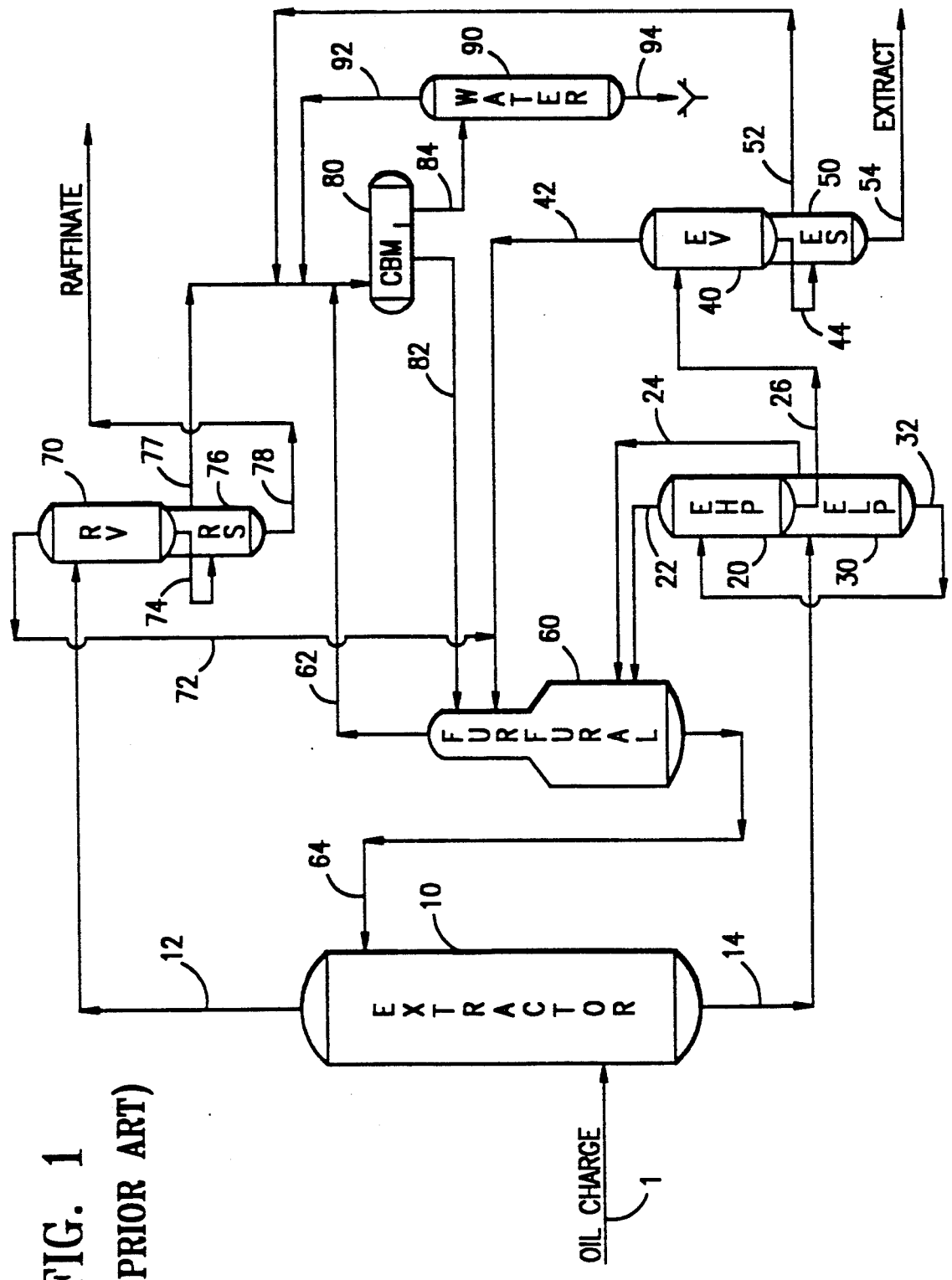
FIG. 1 (Prior Art) is a simplified process flow diagram of a furfural extraction unit.

FIG. 1 shows a conventional furfural extraction unit. An oil charge in line 1 enters liquid/liquid extractor 10 where it contacts a recycled furfural solvent stream added to an upper region of the extractor via line 64. A raffinate phase with a greatly reduced aromatic content is removed via line 12 while an extract phase with most of the aromatics in the oil charged is removed dissolved in furfural solvent via line 14.

The raffinate phase contains a minor amount of furfural dissolved in it, and this furfural is recovered for reuse in raffinate vacuum flash vessel 70. A furfural vapor stream is removed from vessel 70 via line 72 and charged to the furfural fractionator 60. Liquid is removed from vessel 70 and charged to stripper 76 where additional amounts of furfural are removed as a vapor phase. Furfural vapors are sent via line 77 to vessel 80, while raffinate, containing essentially no furfural, is removed via line 78. The raffinate will usually be subjected to additional processing steps such as catalytic or solvent dewaxing, or further fractionation to produce various lubricating oil blending stock fractions.

The extract phase is mostly furfural, with aromatic oil components dissolved in it. In the embodiment shown the extract phase is charged via line 14 to low pressure flash drum 30. A liquid phase is removed via line 32 and charged to high pressure flash drum 20, while a furfural vapor phase is removed via line 24 and charged to the furfural column 60.

A furfural vapor phase is removed from drum 20 via line 22 and charged to the furfural column, while a liquid phase is removed via line 26 and charged to vacuum flash 40. Additional furfural vapor is removed via line 42 and recycled to the furfural column 60, while a liquid phase is removed via line 44 and charged to vacuum stripper 50. Furfural vapor is removed and charged via line 52 to an overhead receiver 80 associated with the furfural column. The furfural extract product, which by this point contain has essentially no furfural, is removed via line 54, for use as fuel, charge to the cat cracker or other use.

The furfural column 60 removes water and constant boiling mixture, CBM, from the furfural solvent. The purified solvent is recycled via line 64 to the extractor 10. A vapor phase is removed via line 62 and charged to receiver 80. Some of the liquid in this receiver is refluxed back to the furfural column via line 82, while a portion is removed via line 84 and charged to water column 90. Column 90 produces a waste water stream which is removed via line 94 for further treatment or disposal and a furfural vapor rich stream which is recycled to the overhead receiver 80 via line 92.

This process flow diagram shows only 2 flash stages on the furfural extract phase removed from the extractor. Many refineries use 3 flash stages. Heaters, heat exchangers, and pumps have been omitted for clarity.

Figure 2:
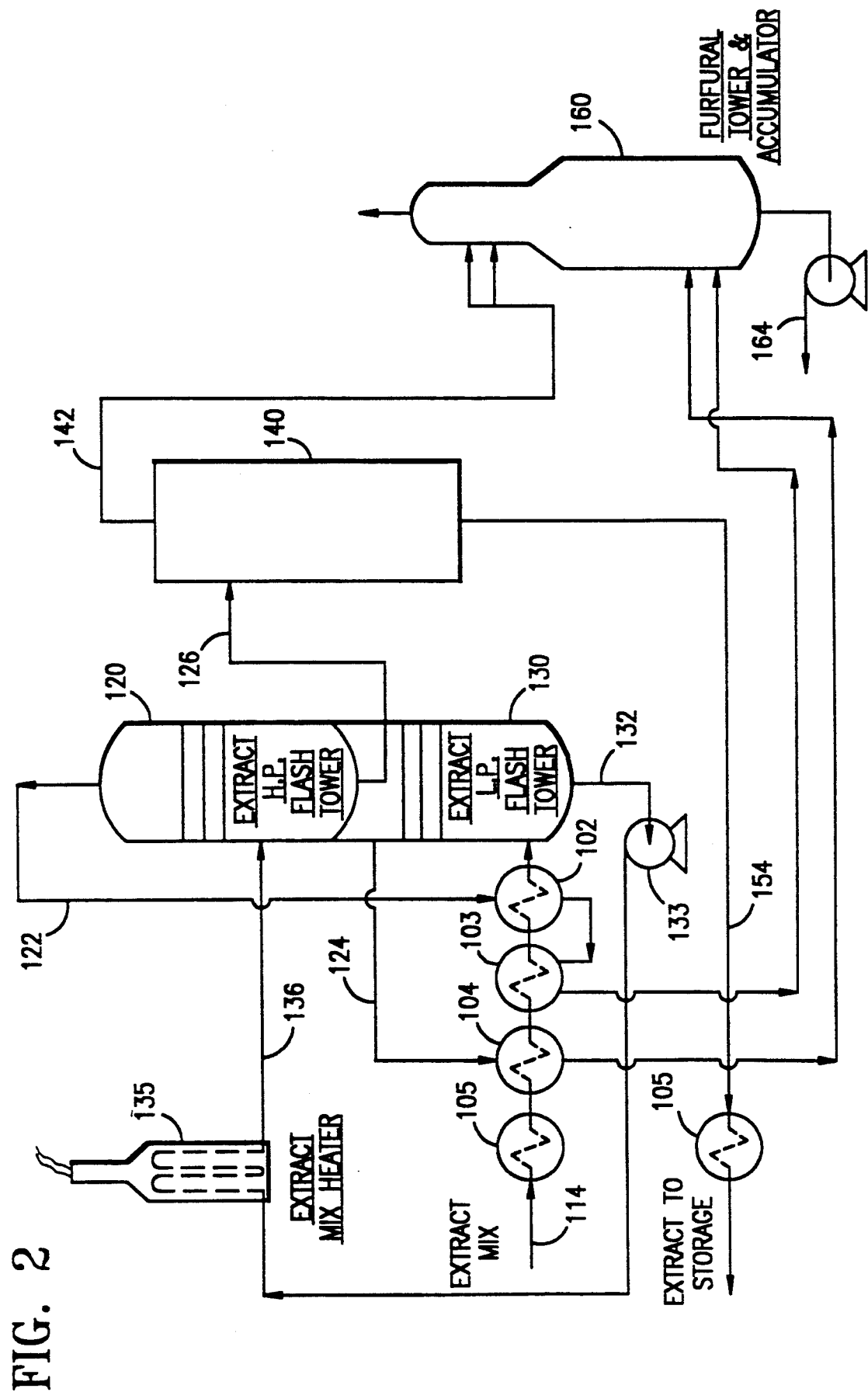
FIG. 2 (Invention) is a simplified process flow diagram of a furfural extraction unit with a thin film evaporator in lieu of a vacuum flash and stripper.

FIG. 2 (invention) shows one embodiment of the invention, and much more detail of the heat exchange relationship between the streams. This embodiment uses a thin-film evaporator downstream of the flash towers, to replace the vacuum flash and stripper used conventionally (vessels 40 and 42 in FIG. 1).

An extract phase from an extractor, not shown, is charged via line 114 through several sets of heat exchangers. The extract is first heated in heat exchanger 105 by indirect heat exchange with a hot extract product stream in line 154. Next, in heat exchanger 104, the extract phase is heated by indirect heat exchange with furfural vapors from the low pressure flash vessel in line 124. Finally the extract phase is heated in two heat exchangers 102 and 103, which heat exchange the extract phase with furfural vapors from the high pressure flash tower in line 122.

The by now thoroughly heated extract phase enters low pressure flash tower 130, which may contain some packing or trays. The extract phase, which by this point is a vapor/liquid mixture, flashes in tower 130 to produce a furfural vapor phase removed via line 124 and a liquid phase which is removed via line 132. The low pressure flash liquid is pumped in pump 133 to a higher pressure and charged to fired heater 135.

Although a fired heater is used, it runs cooler than most conventional units, and is carefully controlled so that the furnace outlet temperature is below a temperature which would cause excessive furfural degradation. In most refineries this involves a furnace bulk outlet temperature of 450° F. or below. Even lower temperatures are desirable to further reduce furfural degradation, but most refineries will need to operate with furnace temperatures fairly near a 450° F. bulk outlet, unless more steam, or reduced pressure conditions are used in the final steam stripping stage.

The heated stream is discharged via line 136 in the high pressure flash tower 120. Furfural vapors are removed via line 122, while a liquid phase is removed via line 126 and charged to thin film evaporator 140. Furfural vapor is removed via line 142, while extract, which is essentially free of furfural, is removed from the bottom of the evaporator via line 154.

Figure 3:
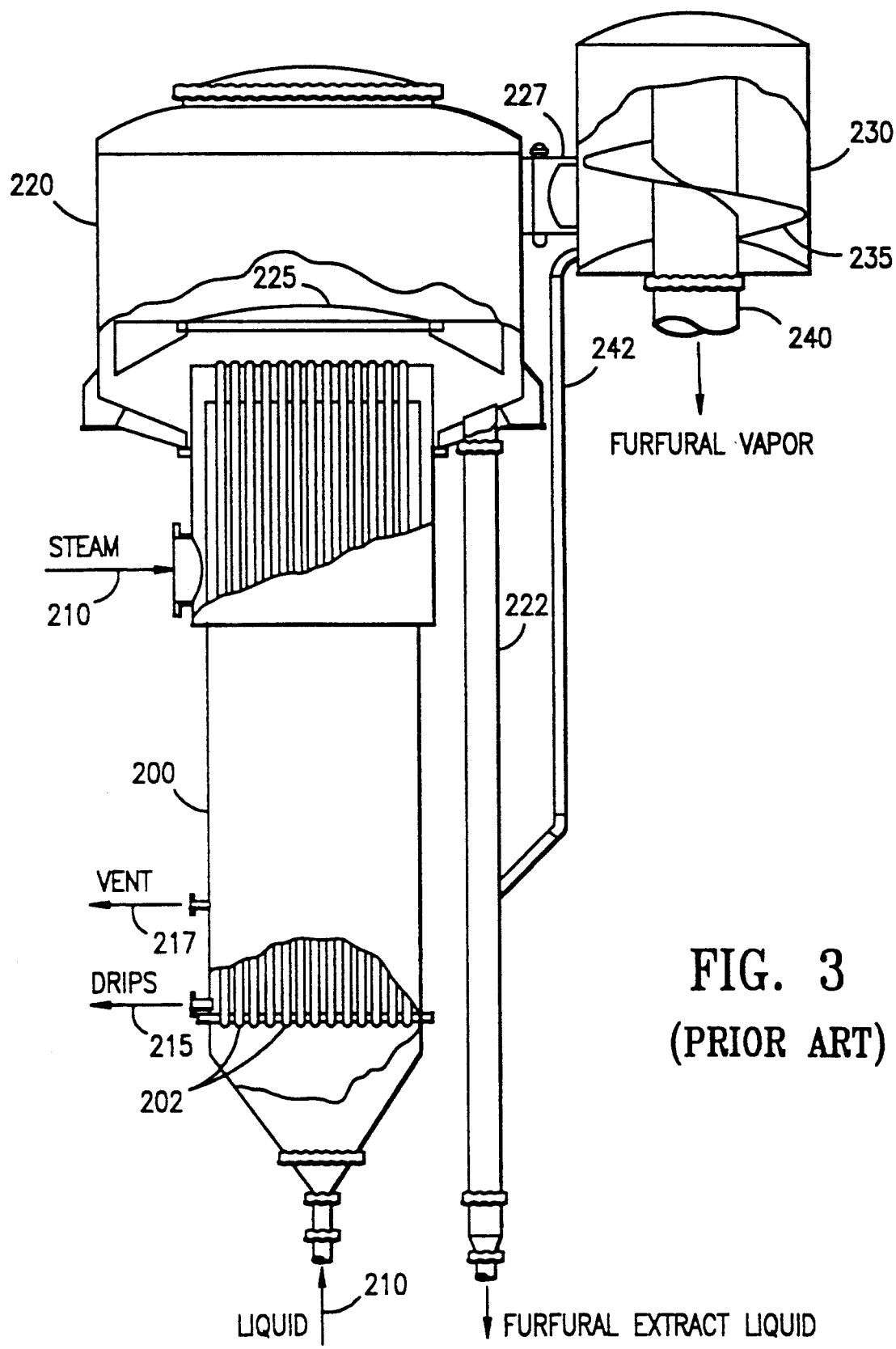
FIG. 3 (Prior Art) is a simplified view of a long-tube vertical evaporator.

FIG. 3 (Prior Art) shows a preferred type of thin film evaporator which may be used herein, a long-tube vertical (LTV) evaporator. It is taken from Kirk-Othmer, Encyclopedia of Chemical Technology, Second completely revised edition, Volume 8, Page 568, FIG. 7.

Liquid feed in line 210 (typically a mixture of furfural and extracted hydrocarbons from a 2nd or 3rd stage flash) is charged to the base of the LTV 200. Liquid enters the tube side of a plurality of tubes 202, is heated to form a two phase mixture which is discharged from the top of the tubes 202 toward baffle 225. Liquid collects in the base of the overhead receiver 220, and is removed via line 222. The liquid may be a furfural free hydrocarbon, in which case it would be sent to furfural extract storage, or may contain a minor amount of furfural which will be removed by conventional steam or vacuum stripping.

Vapors are removed via line 227 and charged to inertial separator 230, where vane 235 imparts a swirling motion to the vapors so that any entrained liquid is thrown to the walls for collection and recycle via line 242. Vaporized furfural is removed via line 240 for use in heating some other part of the furfural extraction process.

Lube Refining

The general steps in refining crude oil to produce lubricating oil are well known. Further details may be taken from the lubricant refining patents which were incorporated by reference. Furfural extraction is widely practiced, more than 40 units have been in operation in the US for more than 30 years. It is not known how many of these have converted to multi-stage, ascending pressure furfural recovery, but probably most or all furfural units operate this way now.

FURFURAL SOLVENT

The furfural solvent is a staple article of commerce, made from pentosan-containing agricultural residues. As used in most refineries it contains a significant amount of oxidation byproducts, which make it more susceptible to degradation. As an example of how bad the furfural is that is used in modern refineries, a comparison of the specification grade material, and the furfural stored in one tank are presented below:

|  | REFINERY TANK | SPECIFICATION GRADE FURFURAL |
|---|---|---|
| INITIAL BOIL POINT | 110 | 324 |

|  | REFINERY TANK | SPECIFICATION GRADE FURFURAL |
| --- | --- | --- |
| 10% BOILING POINT | 181 | +324 |
| 20% BOILING POINT | 307 | +324 |
| FINAL BOILING PT | 340 | 338 |
| TAN (MG/L) | 0.26 | 0.02 |
| COLOR | 3.5 | >1 |
| WATER, WT % | 0.5 | 0.2 |
| OIL, WT % | 3.2 | 0.1 |

FEEDSTOCK

A suitable feedstock is the starting point of the process. A hydrocarbon based stock, containing at least some hydrocarbons boiling in the range of light neutral oil, heavy neutral oil or bright stock will be charged to the furfural extraction tower. The boiling range of light neutral oils is usually from about 650° to 900° F., while for heavy neutrals the boiling range is typically about 850° to 1000° F. Bright stocks consist primarily of hydrocarbons boiling above about 950° F.

The feed is usually charged to the base of a vertical, countercurrent, liquid/liquid extraction tower. A packed or tray containing tower, or a rotating disc contactor (RDC) may be used to facilitate contact of the two immiscible liquids. Furfural is usually added to the top of the tower. Furfural to oil feed ratios may range from 0.5 to 5 volumes of furfural per volume of oil, preferably from about 1.5 to 2.8 volumes of furfural per volume of oil.

The oil is typically fed at a temperature of 100°–300° F., while the furfural is typically at 150°–300° F. The furfural selectively dissolves or extracts aromatic components from the feed, producing an aromatic deficient raffinate hydrocarbon phase and a furfural phase containing an aromatic rich extract.

Conventional Furfural Recovery

Both the extract and raffinate streams are processed for furfural recovery.

The raffinate contains a modest amount of dissolved furfural, typically around 10% and this must be recovered. Conventional stripping, or vacuum stripping, is sufficient for this service.

The extract is mostly furfural. On a molar basis, the extract will usually contain more than 10 moles of furfural per mole of hydrocarbon, with 25 to 50 moles of furfural per mole of hydrocarbon occurring in many commercial installations. Multiple stages of heating and flashing, followed by stripping or vacuum stripping are used commercially. Most refiners are believed to use three stages of furfural flashing, with an ascending pressure and temperature profile so that vapors from a latter stage may heat liquid charge to a prior stage.

The process of the present invention preferably uses this old technology to a great extent. Preferably at least one, more preferably 2 or even 3 stages of furfural heating and flash vaporization occur with an ascending temperature and pressure profile. Thus only the final stages of furfural recovery occur in a thin-film evaporator.

A fired heater may still be used to supply some heat to the system. Use of a thin-film evaporator will permit cooler furnace operation so thermally induced furfural degradation is reduced.

THIN-FILM EVAPORATORS

Any conventional thin-film evaporation equipment can be used, but not necessarily with equivalent results. The most important, and preferred, are long tube vertical evaporators in which vapor flows up the tubes. Other types of thin film evaporators such as falling film evaporators or wiped film evaporators may also be used. Each type will be reviewed in more detail below.

Long-Tube Vertical Evaporators

LTV's are the most widely used device for evaporation. These usual consist of a simple one-pass vertical shell and tube heat exchanger. Liquid can flow up or down the tubes.

In upflow, feed enters at the bottom of the tube and is vaporized as it passes up the tube. A V/L mixture leaves the top of the tube and typically encounters a dished baffle outlet. This typically is used both to deflect liquid from the vapor outlet, and for foam breaking. Preferably little or no liquid level is maintained at the top of the device. Some liquid may be recirculated, but single pass operation is preferred. Steam enters a case encompassing the tube bundle, with condensate removed from a lower portion of the case. A vent for non-condensibles may be provided.

In downflow, a falling-film version of the LTV, liquid enters the tops of the tubes and flows down the walls of the tube as a film. This type, falling-film, is preferred for use in the process of the invention because liquid residence times are very short, which minimizes exposure to furfural degradation conditions. The residence time of the furfural at high temperature is short so relatively high pressure steam may be used as a heat source without coking the furfural.

Horizontal Tube Evaporators, as described in Perry's, may also be used but are not preferred. These are best suited to seawater evaporation, or for applications where headroom is limited, and this is not a concern in most refineries.

Agitated-Film Evaporators

These devices are commercially available from vendors such as LUWA. They are mechanically complex, but reliable, and have even been used in such difficult services as recovery of coal solvent from dissolved coal liquids or to process heat sensitive materials.

The consist of one or more tubes, usually vertical, with liquid wiped on the wall by a paddle or blades.

THIN-FILM SOLVENT RECOVERY PROCESS CONDITIONS

The operating conditions for solvent recovery in a thin film device may be those conventionally used in flash separators, strippers and vacuum strippers.

When a thin film evaporative device is used to replace the HP Flash and associated fired heater the pressure will typically be 15–50 psig in the device, with an appropriate heat source, usually high pressure steam. Preferably the device is operated so that the extract is not heated above about 450° F., though with the very short residence times of such devices a minor amount of furfural may be heated to 450° F. or above without undue degradation.

When a thin film evaporative device is used to replace the stripper, process fluid pressures will usually be lower, and may be atmospheric or subatmospheric. Some form of stripping medium, such as steam, may be added. Somewhat lower temperatures may be used on the shell side of the device, or a high temperature heat source such as 400 psig steam or other high temperature heat source so that equipment size and cost may be minimized.

EXAMPLE 1 (PRIOR ART)

The following material balance shows an extract recovery section associated with a furfural solvent extraction unit.

The unit includes three flash stages, followed by a vacuum stripper. To ensure adequate removal of furfural from the extract, the stripper bottoms temperature (stream #14 in the material balance shown below) must be maintained above 360° F.

There is no external heat source for the stripper, the heat of vaporization is supplied by the fired heater upstream of the HP flash. The fired heater produces some skin temperatures above 450° F., which degrades the furfural.

The charge to the furfural recovery section is a mix of liquid, furfural from the extractor and vapor, the stripper overhead vapor. This liquid is charged to an LP Flash, then an MP Flash, then a HP Flash, and finally to a vacuum stripper.

0.6 barrels/1000 B of feed processed in the furfural extraction unit.

A thin film evaporator could replace the stripper, and permit a reduction in furnace outlet temperature to 450° F. The evaporate would have a tube bundle 2.5 feet in diameter and 30' long. The vapor disengaging head would be about 10.5' in diameter, and have about 1500 square feet of evaporator surface. Steam requirement for the evaporator would be about 4000 lbs/hr of 400 psig steam.

Estimated capital cost of the evaporator is less than 200 M$. The benefits can be 700–1500 1,000 M$/year. Benefits come from several areas, reviewed below:

390 M$/year - reduced furfural consumption
150 M$/year - chemical treatments eliminated
800 M$/year - longer run length
160 M$/year - energy efficiency, steam heated evaporator operates at 90% boiler efficiency instead of 75% efficiency in a fired heater.

There is still a fired heater, but it is operated at a lower temperature, reducing the temperature in the HP flash. There is an increased loading on the falling film evaporator, which replaces the old steam vacuum stripper.

FURFURAL 1 EXTRACT RECOVERY SECTION MATERIAL BALANCE

| STREAM | EX-TRACT MIX | STRIPPER OVHD | CHARGE | LP FLASH OVHD | LP FLASH BOTTOMS | MP FLASH OVHD | MP FLASH BOTTOMS | HP FLASH OVHD | HP OVHD TO D-3 | HP OVHD FM E-1001 | HM & MP FL COND |
|---|---|---|---|---|---|---|---|---|---|---|---|
| STD. B/H | 715 | 34 | 715 | | 558 | | 361 | | | | |
| MLB/HR | 284.5 | 13.5 | 284.5 | 64 | 220 | 80 | 141 | 101 | 13 | 88 | 168 |
| TEMP, F. | 230 | 115 | 230 | 367 | 367 | 398 | 398 | 455 | 455 | 407 | 362 |
| PSIG | | | | 10.3 | 10.3 | 20 | 20 | 35 | 35 | 31 | 16 |
| % LIQUID | 100 | 100 | 100 | 0 | 100 | 0 | 100 | 0 | 0 | 100 | 100 |
| COMPONENT, MOLS/HR | | | | | | | | | | | |
| EXTRACT | 64 | | 64 | 0 | 64 | | 64 | | | | |
| FURFURAL | 2730 | 120 | 2730 | 666 | 2063.2 | 830 | 1234 | 1044 | 123 | 921 | 1751 |
| WATER | 5.8 | 112 | 5.8 | 5.6 | 0.2 | 0.2 | | | | | 0.2 |
| TOTAL | 2799.8 | 232 | 2799.8 | 671.6 | 2127.4 | 830.2 | 1298 | 1044 | 123 | 921 | 1751.2 |

| STREAM | FLSH CND TO F-3 | HP FLASH BOTTOMS | EX-TRACT PRODUCT | STRIPPING STREAM | VAC STR OVHD | F-3 OVHD | D-3 BOTTOMS | F-3 BOTTOMS | DRY FURF | D-3 OVHD | FRF PHASE REFLUX |
|---|---|---|---|---|---|---|---|---|---|---|---|
| STD. B/H | | 113 | 69 | | | | 121 | 630 | 630 | | 8 |
| MLB/HR | 232 | 40 | 21.8 | 0.7 | 18.9 | 25 | 49.4 | 256 | 256 | 5.6 | 3.5 |
| TEMP, F. | 345 | 455 | 361 | 300 | 388 | 345 | 343 | 345 | 345 | 250 | 100 |
| PSIG | 5.5 | 35 | | 20 | −10 | 5.2 | 4.5 | 5.2 | 5.2 | 3.5 | 3.5 |
| % LIQUID | 92 | 100 | 100 | 0 | 0 | 0 | 100 | 100 | 100 | 0 | 100 |
| COMPONENT | | | | | | | | | | | |
| EXTRACT | | 64 | 64 | | | | | | | | |
| FURFURAL | 2417 | 190 | | | 190 | 260 | 513 | 2658 | 2658 | 37 | 37 |
| WATER | 5.8 | | | 39 | 39 | 5.4 | | | | 118 | 0 |
| TOTAL | 2422.8 | 254 | 64 | 39 | 229 | 265.4 | 513 | 2658 | 2658 | 155 | 37 |

Illustrative Embodiment 1

This estimate is based on use of a falling film evaporator to replace the vacuum stripper, for a unit similar in size to that shown in the table above, but which uses a conventional fired heater, and three stages of flashing at ascending pressure and temperature. In the refinery considered, the furnace has to run with excessive furnace outlet temperatures, above 450° F., to operate. The average furfural consumption was in the range of 0.5 to

Illustrative Embodiment 2

This material balance is calculated based on use of a falling film evaporator to replace the HP flash and the fired heater associated with the HP flash. The evaporator is heated with 400 psig steam. The vacuum stripper is retained.

A falling film evaporator 5' in diameter and 30' long, with a surface area of 7000 square feet is required. The vapor disengaging head would be about 6' in diameter. Capital cost would be 325–400 M$. About 27,000 lbs/hr of 400 psig steam is needed.

The economic benefits are similar in both cases.

FURFURAL EVAPORATION BENEFITS

The relative benefits of thin-film (low temperature) furfural evaporation can be seen by comparing several refineries using conventional fired furnaces and conventional furfural recovery to an estimate based on a unit using thin-film evaporation.

| REFINERY | FURF CONS. | FURNACE OUTLET | FURNACE SKIN |
|---|---|---|---|
| A | 0.60 l/kl | 470° F. | 527° F. |
| B | 0.55 l/kl | | 535° F. |
| C | 0.15 l/kl | 433° F. | 500° F. |
| THIN FILM | | 420–430° F. | 440–450° F. |

Refineries A and B are typical, with high furnace skin temperatures, high furfural consumptions, and frequent turnarounds (the units must be decoked every 12–18 months). Refinery C is unusual, it operates in a region of low energy costs and has low furnace outlet and skin temperatures.

Significant savings come in four areas, furfural consumption, chemical treatment, stream time and energy efficiency.

Furfural consumption can be greatly reduced by use of a thin-film evaporator to recover solvent. Roughly ⅔'s of the furfural consumption can be eliminated by using the process of the present invention.

The furfural saving is significant, as can be seen more clearly from the following illustration. For a unit which operates for 500 days, a furfural consumption of 0.6 l/1000 l means a refiner must purchase, and dispose of, an amount of furfural equal to 30% of the daily capacity of the plant. If the unit process 10,000 BPD, the refiner must purchase, and eventually discard, about 3,000 barrels of furfural every 500 days. The process of the present invention eliminates most of this furfural consumption. Chemical treatment, to slow down furfural degradation or at least keep the solid products of decomposition in suspension, can be reduced or eliminated.

Savings also flow from longer stream times. Rather than take a 2 week turnaround for decoking every 12–18 months, it will be possible to extend run length to about 5 years, as is the case now with refinery C. This gives an additional 5 days of stream time each year.

Energy efficiency is improved by replacing or supplementing a fired heater operating at 75% efficiency with a steam heated evaporator. This allows steam to be generated at 90% boiler efficiency.

Although the actual amount of savings varies greatly from unit to unit, and from year to year as costs of feedstocks, fuel and furfural fluctuates, spectacular payouts can be achieved.

The highest payout comes from doing the least, that is, merely using thin-film evaporation to replace the existing stripper. Because thin-film evaporation can recover more furfural, it is safe to reduce the amount of furfural removed in the flash stages by reducing the furnace outlet temperature. In a typical US refinery the equipment costs would be on the order of 0.2 MM$, with benefits of about 0.7 MM$/year from reduced furfural consumption and chemical treating costs. Including all benefits (stream time), the payout per year increases to 1.5 MM$ per year. There are few investments which yield such a rich return, a payout within about two months.

Even more savings can be achieved by more aggressive use of thin film evaporation to replace more of the furfural recovery equipment. Use of a falling film evaporator to replace the HP Flash, and fired furnace, associated therewith, produces even more savings, but at a higher equipment cost. The payout is rapid, usually in less than 6 months, which is an exceptional return on a modest capital investment.

The process of the present invention will allow refiners to significantly extend the run length of their units, and reduce the amount of furfural which must be consumed, and eventually discarded. Significant energy savings can also be achieved, by replacing a fired heater with a steam heated thin film evaporator.

I claim:

1. A process for removal of an aromatic rich fraction from a lubricating oil stock fraction comprising:
   furfural extraction of said oil chargestock in a furfural aromatics extraction means operating at furfural extraction conditions to dissolve said aromatic rich fraction in furfural to produce a raffinate phase containing lubricating oil stock and a furfural extract phase containing said aromatics rich fraction;
   heating said furfural extract phase at a pressure less than about 50 psig by indirect heat exchange with a higher pressure vaporized furfural stream to produce heated extract;
   flashing said heated extract in a low pressure flash vessel operating at a pressure less than 50 psig to produce a low pressure furfural vapor phase and a low pressure flash liquid phase containing furfural solvent and aromatics which is removed from said vessel;
   heating, and simultaneously vaporizing, at least a portion of said low pressure flash liquid phase by indirect heat exchange in a thin-film evaporator to produce an aromatic rich liquid phase product with a reduced furfural content and vaporized furfural; and
   cooling and condensing said vaporized furfural to produce liquid furfural; and
   recycling said liquid furfural to said liquid/liquid aromatics extraction means.

2. The process of claim 1 wherein the hydrocarbon feed boils in the range of light neutral lube stock, heavy neutral stock, or bright stock.

3. The process of claim 1 wherein the furfural extraction conditions include a furfural solvent:feed volume ratio of 1:1 to 5:1, a furfural extraction temperature of 100° to 300° F., and pressure sufficient to maintain liquid phase operation.

4. The process of claim 1 wherein two stages of heating and flashing are used upstream of thin-film evaporation, each at increasing pressure.

5. The process of claim 4 wherein three stages of heating and flashing are used upstream of thin-film evaporation, and a fired heater operating at an outlet temperature no greater than 450° F. heats the liquid feed to the third stage flash.

6. The process of claim 1 wherein the thin-film evaporator is selected from the group of a long tube evaporator, a falling film evaporator and an agitated film evaporator.

7. The process of claim 1 wherein additional amounts of furfural are evaporated from said high pressure liquid phase by vacuum flashing or stripping.

8. A multi-stage process for recovering furfural solvent from a feed liquid stream comprising hydrocarbons boiling within the range of 600° to 1000° F. and furfural present in an amount equal to at least 10 moles of furfural per mole of hydrocarbon, comprising:
   a. heating said feed liquid stream by indirect heat exchange with a higher pressure vaporized furfural stream to produce a heated liquid stream;
   b. flashing said heated feed liquid stream in a low pressure flash vessel operating at a pressure below 50 psig to produce a low pressure furfural vapor phase and a low pressure flash liquid phase containing furfural solvent which are removed from said vessel;
   c. pumping said low pressure flash liquid phase to produce a pumped liquid stream having a higher pressure;
   d. heating said pumped liquid by indirect heat exchange with a vaporized furfural stream to produce a heated pumped liquid stream;
   e. flashing said heated pumped liquid in at least one high pressure flash vessel operating at a pressure above said low pressure flash vessel to produce a high pressure furfural vapor phase and a high pressure liquid phase;
   f. cooling and condensing at least a portion of said high pressure furfural vapor phase by indirect heat exchange with said feed liquid stream to produce a liquid furfural solvent product stream;
   g. evaporating additional amounts of furfural from said high pressure liquid phase by indirect heat exchange in a thin film evaporator to produce a hydrocarbon liquid product containing a reduced amount of furfural and a furfural vapor product.

9. The process of claim 8 wherein the hydrocarbon feed boils in the gas oil or vacuum gas oil range.

10. The process of claim 8 wherein the feed stream is a furfural extract stream from a furfural liquid/liquid extraction means.

11. The process of claim 8 wherein three stages of heating and flashing are provided, each at increasing pressure, and wherein heating for the third stage of flashing occurs in a fired heater and thin film evaporation is used to remove furfural from a third stage flash liquid product.

12. The process of claim 8 wherein three stages of heating and flashing are used, each at increasing pressure, and wherein heating for the third and final stage of flashing occurs in a thin film evaporator.

13. The process of claim 8 wherein the thin film evaporator is selected from the group of a long tube evaporator, a falling film evaporator and an agitated film evaporator.

14. A multi-stage process for recovering furfural solvent from a feed liquid stream comprising hydrocarbons boiling within the range of 600° to 1000° F. and furfural present in an amount equal to at least 10 moles of furfural per mole of hydrocarbon, comprising:
   a. heating said feed liquid stream by indirect heat exchange with a higher pressure vaporized furfural stream to produce a heated liquid stream;
   b. flashing said heated feed liquid stream in a low pressure flash vessel operating at a pressure below 50 psig to produce a low pressure furfural vapor phase and a low pressure flash liquid phase containing furfural solvent which are removed from said vessel;
   c. pumping said low pressure flash liquid phase to produce a pumped liquid stream having at least 5 psi higher pressure;
   d. heating said pumped liquid by indirect heat exchange with a vaporized furfural stream having a pressure at least 5 psi higher than the pressure of said pumped liquid to produce a heated pumped liquid stream;
   e. flashing said heated pumped liquid in at least one high pressure flash vessel operating at a pressure at least 5 psi above said low pressure flash vessel to produce a high pressure furfural vapor phase and a high pressure liquid phase;
   f. cooling and condensing at least a portion of said high pressure furfural vapor phase by indirect heat exchange with said feed liquid stream to produce a liquid furfural solvent product stream;
   g. evaporating additional amounts of furfural from said high pressure liquid phase by indirect heat exchange in a thin film evaporator to produce a hydrocarbon liquid product containing a reduced amount of furfural and a furfural vapor product.

15. The process of claim 14 wherein three stages of heating and flash vaporization are used, and the first stage operates at a pressure of about 10 psig, the second stage operates at a pressure of about 20 psig, the third stage operates at a pressure of about 35 psig, and wherein said third stage is a vertical long-tube evaporator.

* * * * *